United States Patent [19]

Grobben

[11] Patent Number: 4,799,209

[45] Date of Patent: Jan. 17, 1989

[54] CLAMPING DEVICE FOR CLAMPING AN OPTICAL DISC ONTO A DRIVE SPINDLE

[75] Inventor: Henri M. Grobben, Hasselt, Belgium

[73] Assignee: U.S. Philips Corporation, New York, N.Y.

[21] Appl. No.: 76,824

[22] Filed: Jul. 23, 1987

[30] Foreign Application Priority Data

Jul. 28, 1986 [NL] Netherlands ............. 8601938

[51] Int. Cl.⁴ .................. G11B 17/04; G11B 25/04
[52] U.S. Cl. .................. 369/75.2; 369/270; 360/99.07
[58] Field of Search .......... 369/270, 75.2, 77.2; 360/86, 97, 99

[56] References Cited

U.S. PATENT DOCUMENTS 4,592,040  5/1986  Ohsaki ................. 369/270
4,701,901 10/1987  Imai ................... 369/75.2

*Primary Examiner*—Steven L. Stephan
*Attorney, Agent, or Firm*—F. Brice Faller

[57] ABSTRACT

Device for clamping an optical disc on a turntable (19) includes a turntable which is supported in a chassis (11) and which has a centring member (19B), and a pressure element (15) which is movably supported in a frame (17). The pressure element comprises a holder (37) and a pressure member (39). The holder comprises three resilient limbs (51) which extend in substantially radial directions and which resiliently enclose a central spindle (47) of the pressure member for positioning the pressure member centrally in the holder.

7 Claims, 4 Drawing Sheets

CLAMPING DEVICE FOR CLAMPING AN OPTICAL DISC ONTO A DRIVE SPINDLE

The invention relates to a clamping device for clamping, in particular an optical disc, having a center hole onto a turntable which is rotatable about an axis of rotation and which has a centering member. A pressure element movably connected to a frame includes a holder for a rotatable pressure member having a centering wall, the pressure element being movable between a first position in which the holder keeps the pressure member spaced from the turntable and a second position in which the pressure member cooperates with the turntable.

GB No. 2,148,579 to which U.S. Pat. No. 4,592,040 corresponds, describes an optical disc player employing such a clamping device. The known clamping device includes a turntable which is mounted for rotation in the frame of the disc player and a pressure element or pressure lever which is pivotally connected to the frame by a pivoting spindle. The pressure lever includes an arm portion and a pressure-member holder, the holder being connected to the arm by a spindle which extends parallel to the pivoting spindle. The pressure lever is pivotable about the pivoting spindle between a first position and a second position.

In its first position the lever occupies a position relative to the turntable in which the pressure member is situated at a sufficient distance from the turntable to allow an optical disc to be placed onto or to be moved from the turntable. In this position the pressure member is situated loosely in the holder and is freely movable therein over a specific distance in the axial and in the radial direction. In the second position the pressure lever is pivoted to position nearer the turntable in comparison with the first position, the pressure member pressing a disc placed on the turntable against the supporting surface of the turntable. The turntable is provided with a centering mandril for centering the disc on the turntable. In its side facing the turntable the pressure member has a central cavity with a centering wall. When the pressure lever is moved from the first to the second position the centering pole of the pressure member slides along the centering mandril to center the pressure member relative to the turntable, so as to ensure that in the second position of the pressure lever the pressure member occupies the correct position relative to the turntable and the optical disc.

The construction described above is found to perform satisfactorily as long as the turntable and the pressure element are supported in the same frame. However, in certain cases it may be desirable to support the turntable and the pressure element in a separate frame each. Such a situation occurs, for example, if a disc-record player comprises a loading mechanism with an extensible drawer for transferring an optical disc towards and away from the turntable. In such a case it may be important that the drawer has a stable extended position.

Such a stable extended position, which simplifies placing a disc onto or removing it from the drawer, can be obtained in a manner known per se by supporting the drawer and the pressure element which can be actuated by the drawer in a chassis or first frame which is immovably secured relative to the housing of the disc player. Other parts of the disc-record player, such as the optical scanning unit and hence the turntable, however, should be supported in a deck plate or second frame which is connected to the housing by resilient and shock-absorbing connecting elements. Such a construction therefore requires the use of two frames which are independently movable relative to one another, the turntable being supported in the second frame and the pressure element being supported in the first frame.

When the known clamping device is used in a construction comprising two frames as described above, this may give rise to problems when the pressure element is moved from its first to its second position. This is because the pressure member, which occupies an arbitrary position inside the holder, may be misaligned relative to the turntable in specific positions of the frame relative to each other, for example as a result of vibrations. The pressure member may then be so radially displaced relative to so the turntable, so that the pressure member cannot be centered because the centering mandril just fails to contact with the centering wall. As a result of this, the optical disc cannot be pressed down correctly and, in addition, the clamping device may be damaged.

SUMMARY OF THE INVENTION

The holder includes at least three resilient limbs which each have a free end and a fixed end portion, which is connected to the holder, the free end portions of the resilient limbs being collectively configured to journal a central spindle of the pressure member so as to be radially movable relative to the holder.

The measures applied in the clamping device ensure that the pressure member, in positions in which it is not in contact with the turntable, occupies a more or less fixed central position relative to the holder of the pressure element. When the turntable and pressure element move relative to each other the displacements of the pressure member relative to the turntable are restricted to such an extent that under all circumstances the pressure member and the turntable can be coupled to each other correctly when the pressure element is moved from the first to second position.

It is to be noted that it is known to provide disc-record players in which the pressure element is supported in a first frame and the turntable in a second frame with a device for coupling the two frames to each other when an optical disc is clamped onto the turntable, to preclude problems arising during the movement of the pressure element from its first to its second position. Such a device is rather intricate and cannot readily be used in every disc-record player.

A suitable embodiment in which the resilient limbs exert the required radial forces on the pressure member without any significant frictional forces being produced when the pressure member rotates, is characterized in that in the relaxed condition the resilient limbs extend in at least substantially radial directions and form at least substantially equal angles with one another. Thus when the spindle is received between the free ends, the free ends are biased against the spindle. In this respect it may also be favourable to bend the free end portions of the resilient limbs towards the spindle of the pressure member.

The invention also relates to a disc-record player comprising a loading mechanism for loading a disc, in particular an optical disc, which player has a chassis, the loading mechanism comprising a drawer which is movable through a front opening in the housing between a slid-out and a slid-in position for bringing the disc into a playing position, the chassis being provided with guide means for moving the drawer. The player further includes a drive unit for driving the drawer and a clamping device in accordance with the invention, the frame of the clamping device being connected to the chassis by resilient and clamping means so as to be movable to a limited extent. Preferably, the drawer is provided with means for moving the pressure element of the clamping device between its first and its second position.

DETAILED DESCRIPTION OF THE PREFERRED EMBODIMENT

Figure 1:
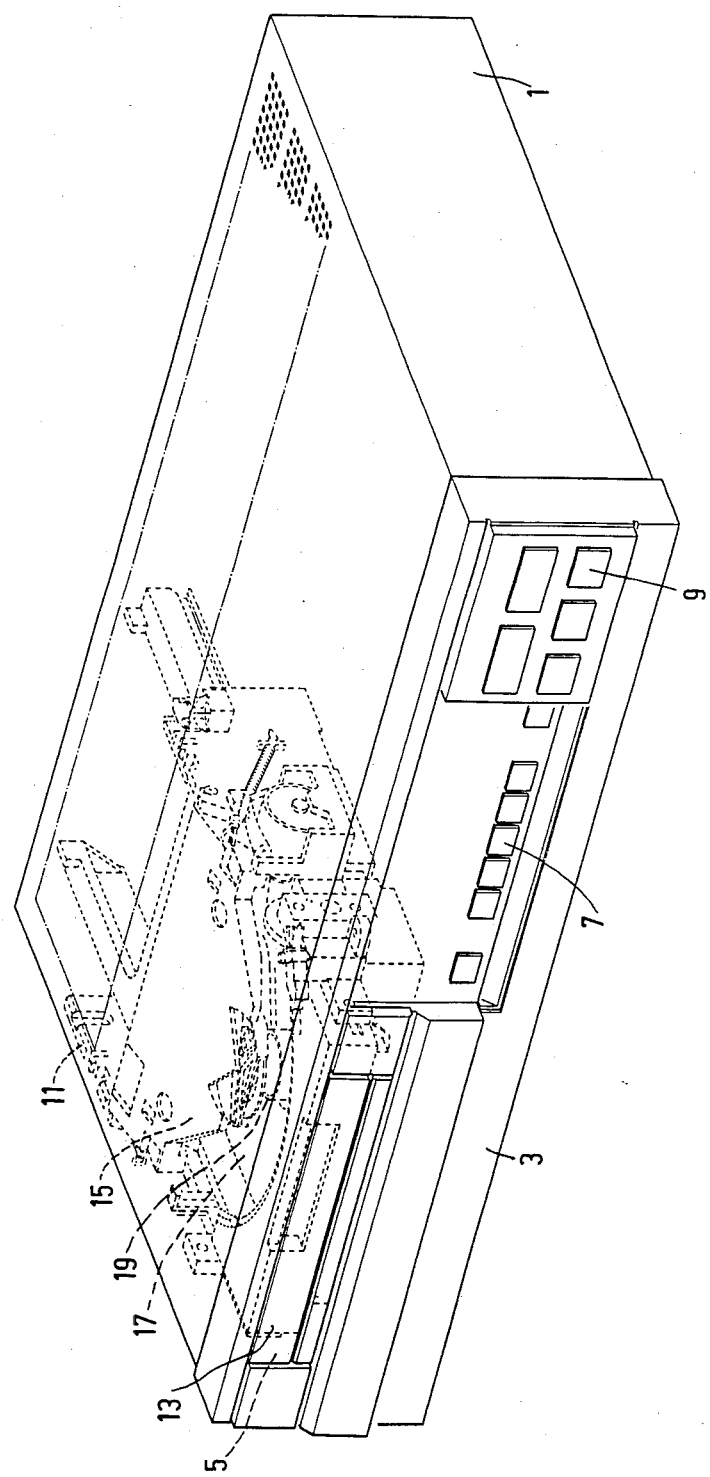
FIG. 1 is a perspective view of an optical disc-record player employing the clamping device.
Figure 2:
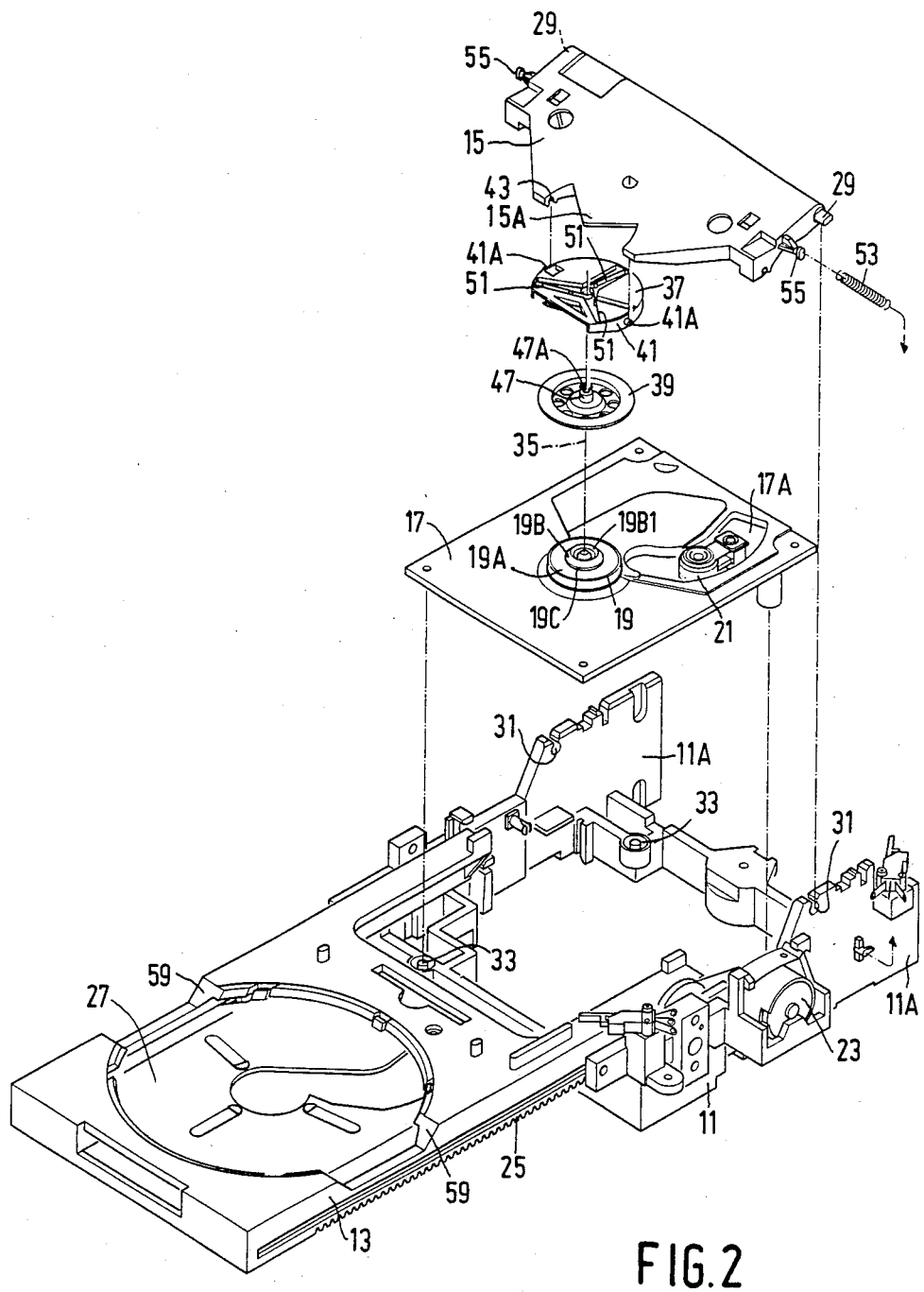
FIG. 2 is an exploded view of the clamping device.

The optical disc-record player shown in FIG. 1 includes a housing 1 having a front wall 3 in which a front opening 5 is formed. The front wall 3 further carries actuating keys 7 and programming keys 9. In the housing a chassis 11, referred to hereinafter as first frame 11, is fixedly mounted and supports a drawer 13 and a pressure element 15. Further, a deck plate 17, referred to hereinafter as second frame 17, is arranged in the housing to support a turntable 19 and an optical scanning unit 21, (see also FIG. 2).

The first frame 11 is provided with drive means including an electric motor 23 and gear wheels which cooperate with teeth 25 of the drawer 13 for rectilinear movement of the drawer into and out of the housing. The drawer 13 comprises a transfer means 27 for supporting a Compact Disc. The pressure element 15 is pivotally connected to the first frame 11 by means of two pivot pins 29. The pivot pins engage in suitable recesses 31 formed in upright wall portions 11A of the first frame 11.

The second frame 17 is secured to the first frame 11 by means of four resilient and damping elements 33 in such a way that vibrations to which the housing 1 and the first freame 11 are subjected are not transmitted to the second frame 17 or are at least damped. This construction consequently permits the frames 11 and 17 to move relative to one another. In the second frame 17 the turntable 19 is mounted for rotation about an axis of rotation 35 which extends transversely of the sliding direction of the drawer 13. The turntable 19 is coupled to a drive motor, not shown, which is secured to the second frame 17, and includes a supporting surface 19A which is concentric with the axis of rotation 35 and is situated at the periphery of the turntable. Further, the turntable comprises a percentering cone 19B and a centering cylinder 19C having a diameter which is slighly smaller than the diameter of the center hole of the optical disc to be played. The optical scanning unit 21 which is pivotally supported in the second frame is movable through an opening 17A in the second frame 17. The scanning unit 21 serves for optically reading the optical disc during operation. A comprehensive description of such a scanning unit can be found in U.S. Pat. No. 4,403,316 (herewith incorporated by reference).

Figure 3:
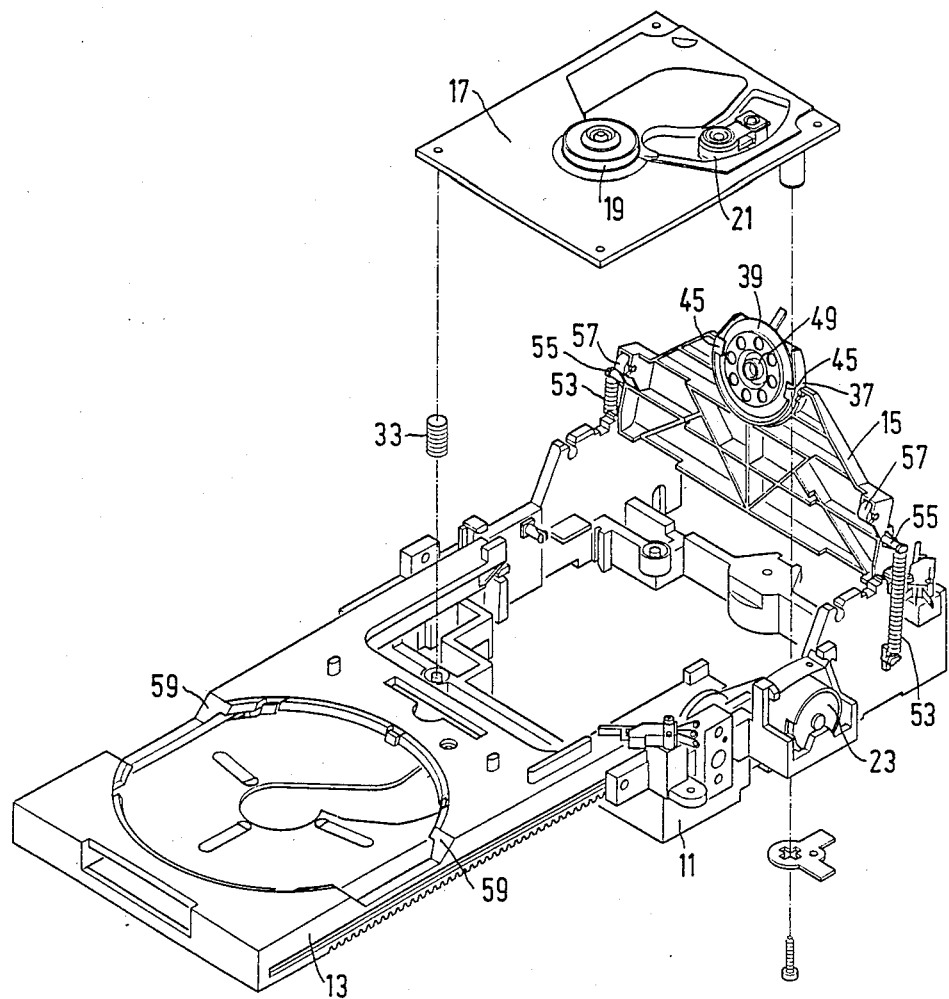
FIG. 3 shows the clamping device in another position.

Referring also to FIG. 3, the flap-like pressure element 15, which is movable relative to the turntable includes a holder 37 for a disc-shaped pressure member 39. The holder 37 has a cylindrical plastic wall portion 41 with two trunnions 41A which movably engage in recesses 43 formed in the pressure element 15. The holder 37 is pivotable about the trunnions 41A through a limited angle relative to the pressure element 15. The pressure member 39, which serves to press an optical disc onto the turntable 19 during operation, is situated partly inside the space in the holder 37 which is bounded by the wall portion 41. Two inwardly directed ribs 45 connected to the wall portion ensure that the pressure member 39 cannot fall out the holder when the pressure member 39 is lifted off the turntable 19 by a pivotal movement of the pressure element 15.

The pressure element 15 is pivotable about pivot pins 29 between a first position, in which the pressure member 39 is situated at an adequate distance from the turntable 19 to allow a disc to be placed on or to be removed from the turntable, and a second position, in which the pressure member 39 presses a disc against the turntable 19. In FIG. 1 the pressure element 15 is in its second position and in FIG. 3 it is shown in a first position. It is to be noted that for the sake of clarity FIG. 3 shows the pressure element 15 tilted through an angle of approximately 90°. In practice, the tilting angle need only be a few degrees, for example 15°.

On its upper side the pressure member 39 is provided with a spindle 47 having a free end 47A against which a portion 15A of the pressure element 15 is pressed in the second position of the pressure element 15. On its underside the pressure member 39 has a cylindrical centering wall 49 which is constructed to cooperate with a centering edge 19B1 of the percentering cone 19B.

In the first position of the pressure element 15 the pressure member 39 is situated in the holder 37 with clearance both in the axial and in the radial direction, the mechanism being so dimensioned that in the second position of the pressure element 15 the pressure member is not in contact with the wall portion 41 and the ribs 45 of the holder 37.

A radial displacement of the pressure member 39 relative to the holder 41 and hence relative to the pressure element 15 is necessary to enable the pressure member 39 to be centered relative to the turntable 19 during the pivotal movement of the pressure element 15 from its first to its second position, the centering wall 49 sliding along the centering edge 19B1 into the cone 19B.

Figure 4:
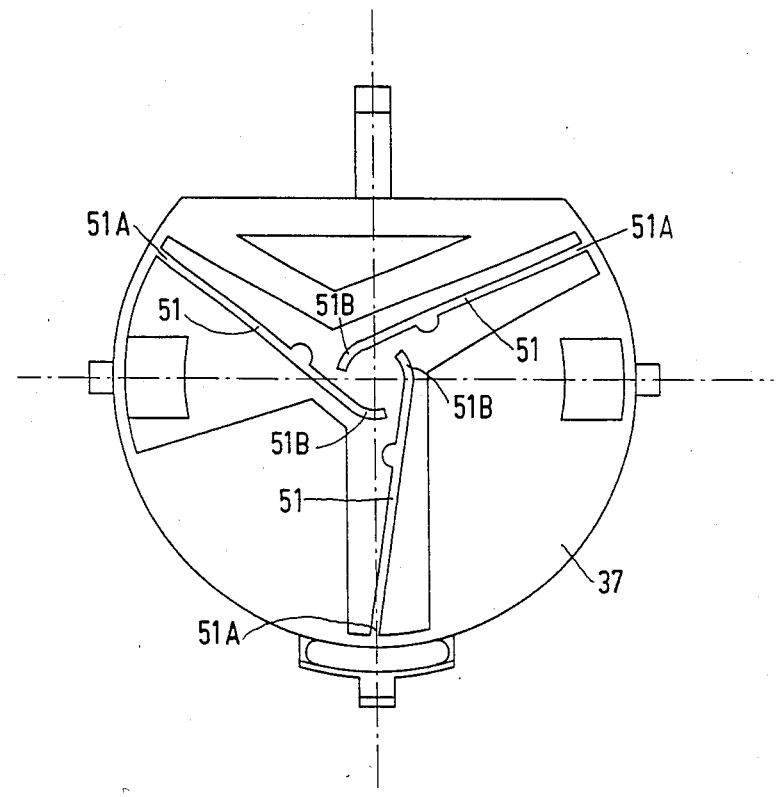
FIG. 4 is a plan view of the holder of the clamping device in accordance with the invention.

Referring also to FIG. 4, the holder 37 is provided with three plastic limbs 51 which each have a fixed end 51A which is connected to the wall portion 41. The limbs 51 extend in a substantially radial direction and each have a curved free end portion 51B. Together the free end portions 51B journal the spindle 47 of the pressure member 39, the limbs keeping the pressure member 39 centered in the holder 37 when it is not in contact with the cone 19B of the turntable 19. However, the special arrangement of the limbs 51 allows the pressure member 39 to move radially for the purpose of centering relative to the turntable during its cooperation with the cone 19B.

The above clamping device has the advantage that also in the case of very large displacements of the frames 11 and 17 relative to each other it can be guaranteed that the centering wall 49 of the pressure member 39 and the centering edge 19B1 of the cone 19B are in functional contact with each other to center the pressure member 39 relative to the turntable 29 during the movement of the pressure element 25 from its first to its second position.

It is to be noted that in the present embodiment the pressure to be exerted on the pressure member 39 by the pressure element 15 in the second position of the pressure element is furnished by two tension springs 53 which are secured to the first frame 11 at one of their ends and to projections 55 of the pressure element 15 at their other ends. The pivotal movement from the second to the first position of the pressure element is derived from the inward movement of the drawer 13 in that two wheels 57 of the pressure element 15 run over two surfaces 59 of the drawer 13.

In the embodiment described above the three limbs are arranged in three slotted openings in the upper wall of the holder. It is obvious that the invention is not limited to the embodiment described but that other embodiments are possible within the scope of the invention. For example, a translatable pressure element may be utilized, or the holder may be provided with four limbs.

What is claimed is:

1. A clamping device for clamping a disc having a center hole onto a turntable, the device comprising
    a turntable rotatable about an axis of rotation and having a centering member for reception in said hole,
    a first frame,
    a pressure element movably connected to said first frame, said pressure element being movable between a first position and a second position,
    a holder carried by said pressure element, said holder comprising at least three resilient limbs, each limb having a fixed end and a free end, said free ends being collectively configured to journal a spindle for radial movement, and
    a pressure member having a central spindle journaled between said free ends of said resilient limbs and a centering wall configured to cooperate with said centering member, said pressure member being spaced from the turntable in the first position and cooperating with the turntable in the second position.

2. A clamping device as claimed in claim 1, characterized in that in the relaxed condition the resilient limbs extend in at least substantially radial directions and form substantially equal angles with one another whereby the free ends are biased against the spindle.

3. A clamping device as claimed in claim 1, characterized in that the free end portions of the resilient limbs are cured about the spindle.

4. A disc record player for playing a disc having a center hole, the player comprising
    a housing having a front opening therein,
    a first frame fixed in said housing and provided with guide means,
    a drawer which is movable through said front opening along said guide means, between a slid-out and a slid-in position for bringing the disc into a playing position,
    a second frame resiliently mounted to the first frame,
    a turntable mounted in said second frame, said turntable being rotatable about an axis of rotation and having a centering member for reception in said hole,
    a pressure element movably connected to said first frame, said pressure element being movable between a first position and a second position,
    a holder carried by said pressure element, said holder comprising at least three resilient limbs, each limb having a fixed end and a free end, said free ends being collectively configured to journal a spindle for radial movement, and
    a pressure member having a central spindle journaled between said free ends of said resilient limbs and a centering wall configured to cooperate with said centering member, said pressure member being spaced from the turntable in the first position and cooperating with the turntable in the second position.

5. A disc-record player as claimed in claim 4, characterized in that the drawer is provided with means for moving the pressure element between its first and its second position.

6. A disc record player as in claim 4 wherein in the relaxed condition the resilient limbs extend in at least substantially radial directions and form substantially equal angles with each other, whereby the free ends are biased against the spindle.

7. A disc record player as in claim 4 wherein the free ends of the resilient limbs are curved about the spindle.

* * * * *